April 3, 1962 C. W. JOHNSON 3,028,097
HEATER FOR ANIMAL PENS AND THE LIKE
Filed July 18, 1957 3 Sheets-Sheet 2
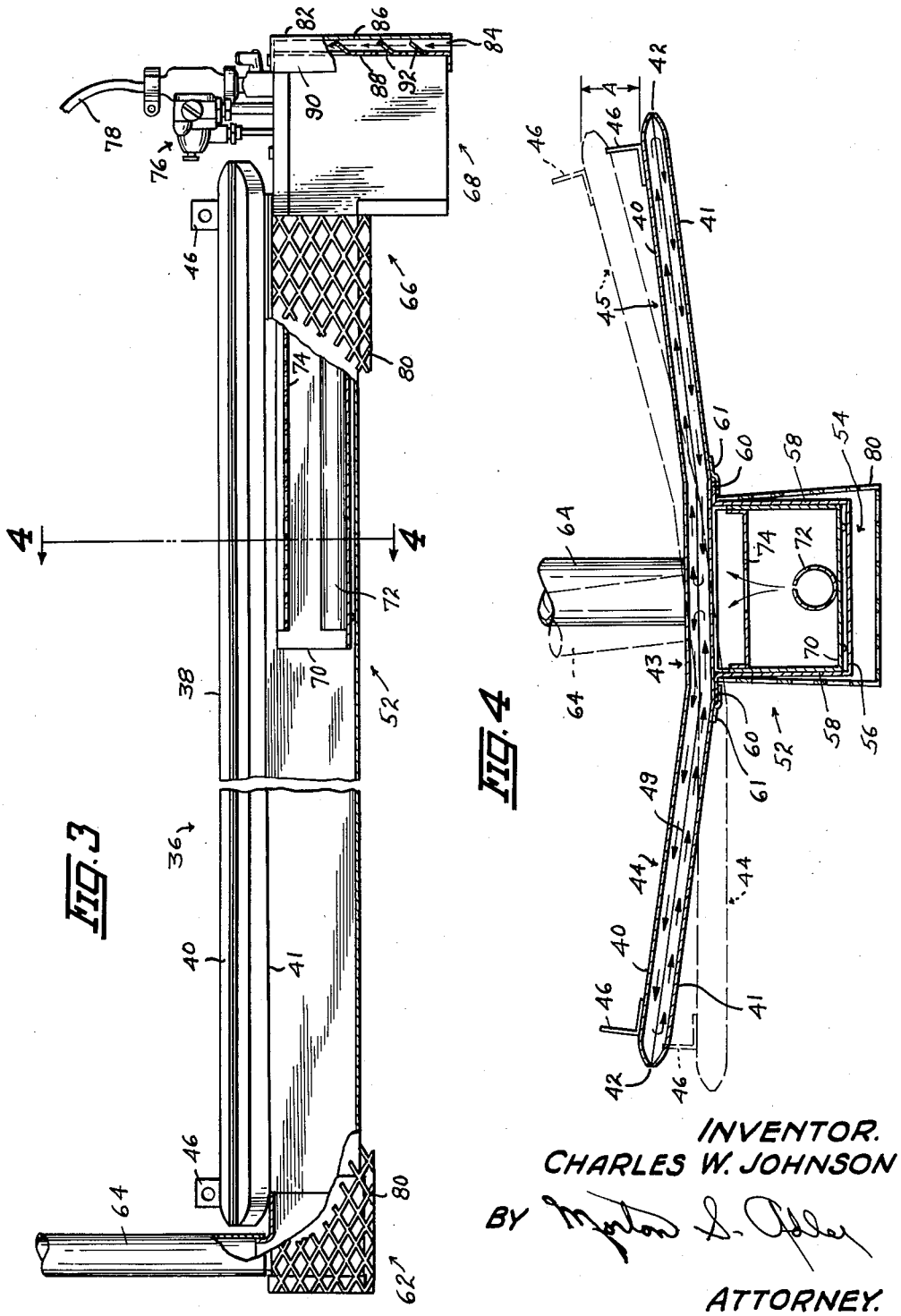
INVENTOR.
CHARLES W. JOHNSON
BY
ATTORNEY.

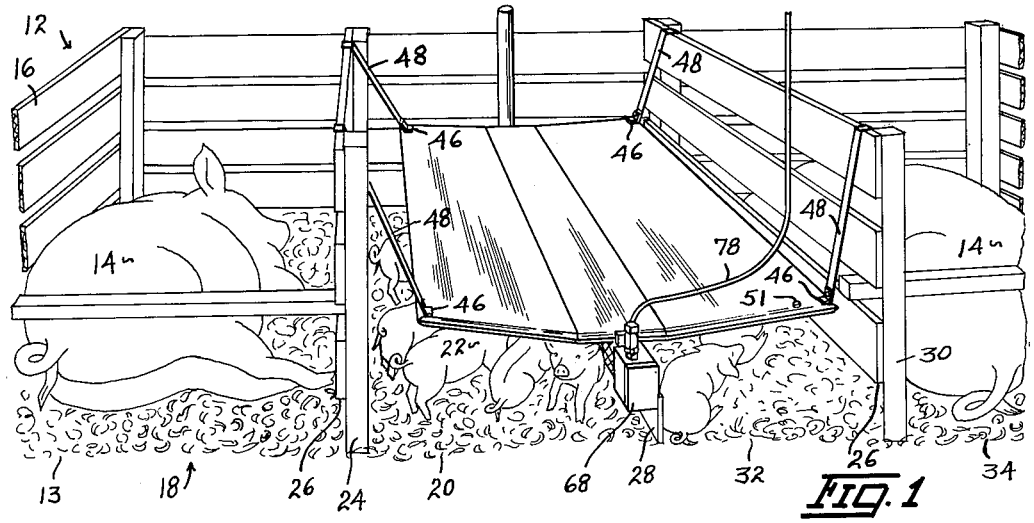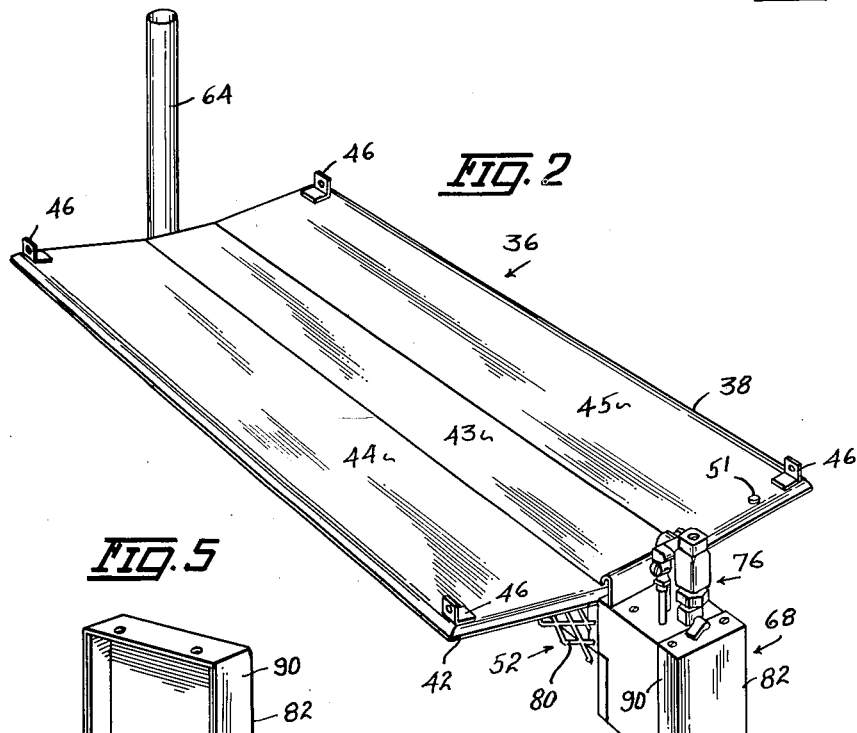

April 3, 1962 C. W. JOHNSON 3,028,097
HEATER FOR ANIMAL PENS AND THE LIKE
Filed July 18, 1957 3 Sheets-Sheet 3
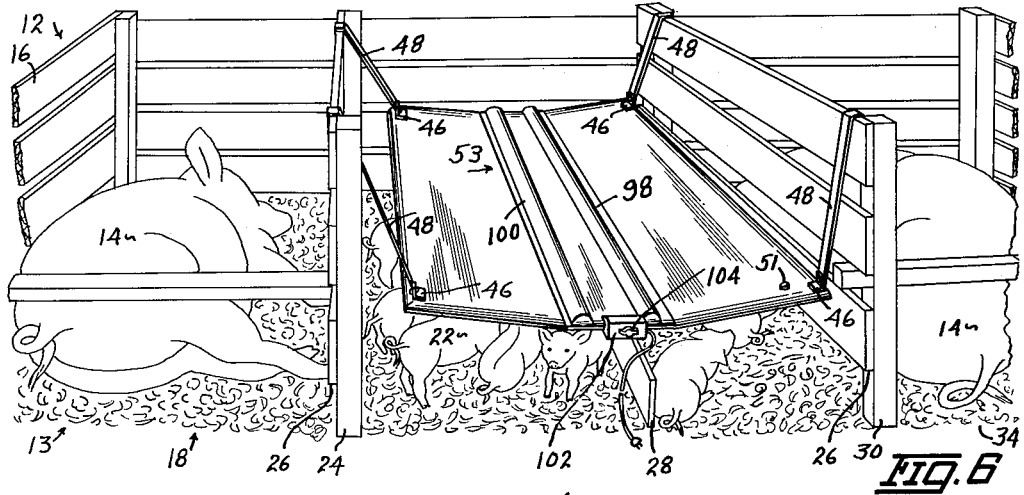
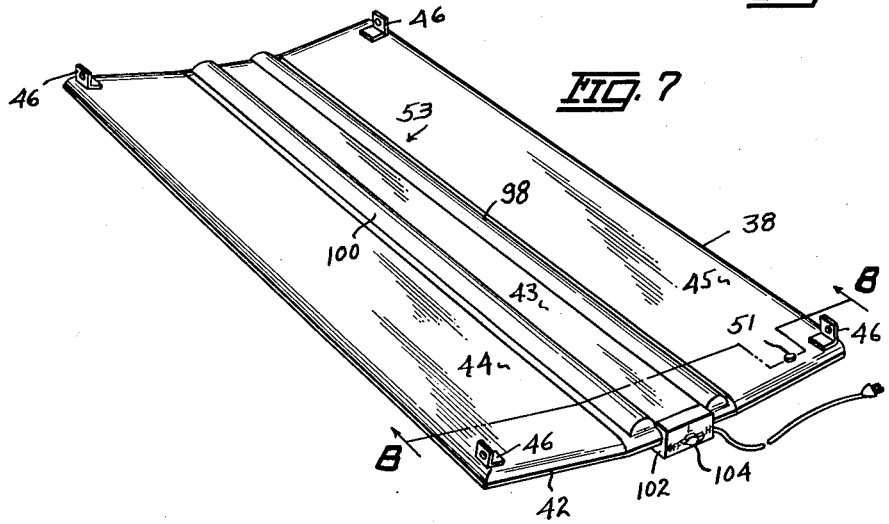
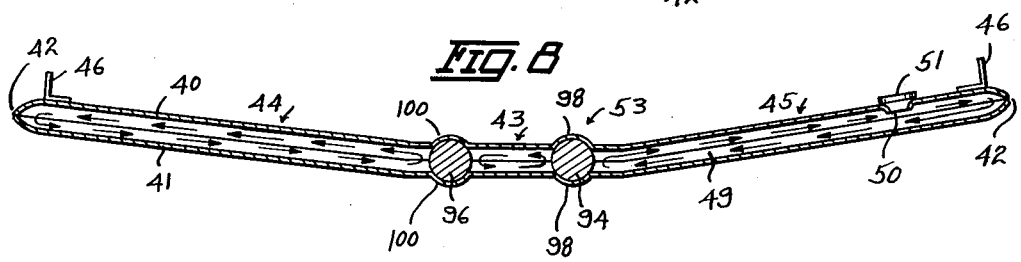
INVENTOR.
CHARLES W. JOHNSON
BY Morton S. Adler
ATTORNEY.

United States Patent Office 3,028,097
Patented Apr. 3, 1962

3,028,097
HEATER FOR ANIMAL PENS AND THE LIKE
Charles W. Johnson, Cedar Rapids, Iowa, assignor to Johnson Gas Appliance Company, Cedar Rapids, Iowa, a corporation of Iowa
Filed July 18, 1957, Ser. No. 672,728
7 Claims. (Cl. 237—14)

My invention relates to a new and improved heating apparatus for animal pens and has been designed more particularly for winter use in pig farrowing pens in view of the fact that the farrowing of pigs during the wet and cold of winter months is a hazardous and expensive gamble for farmers due to the high mortality rate resulting from sickness and diseases incurred in wet and dank bedding and unsatisfactory pen temperatures. However, while I have preferably made this invention for use in pig farrowing pens as indicated and have illustrated the same with reference thereto as will later appear, it will be understood that it is not my intention to limit the use of this invention since it has equal and efficient application without modification for use in chicken brooders, pig creeps and other similar places where heat is required in the care of animals.

One of the important objects of this invention is to provide a heating apparatus for an animal pen that will furnish radiant heat from above the pen at a uniform temperature sufficient to keep the animals and bedding dry and warm irrespective of the outside temperature or weather conditions.

Another object inhering herein is the provision of a heating apparatus of the above class that is completely fireproof to afford full assurance that under no conditions can straw in the pen become ignited such as by working its way into the combustion chamber or being exposed to temperatures above the kindling point therefor.

A further object herein is to provide a heater as indicated for use in a pig farrowing pen which is preferably large enough to accommodate two litter of pigs and to provide them with adequate heat until they are four or five weeks old.

Still another important object contemplated by this invention is the provision of a heating device for an animal pen with a blanket-like heat distribution tank containing a liquid that is non-freezable for all practical purposes and including a heating element for raising such liquid to and maintaining it at a pre-determined temperature.

Another object of this invention is to provide in a heating apparatus as disclosed, novel structural arrangements permitting the heat distribution tank to be tilted, if necessary, within reasonable limits without affecting the uniformity of heat throughout the surface of the tank.

Other objects and advantages of this invention reside in the details of construction and correlation of the various parts and will be apparent as the description proceeds.

This invention consists of novel parts and combination of parts to be hereinafter described whereby the objects set forth are attained, as pointed out in the claims, and illustrated in the accompanying drawings, in which:

FIG. 1 is a perspective view of a pig farrowing pen showing my new heating apparatus in operating position therein, FIG. 2 is an enlarged perspective view of this invention, FIG. 3 is a side elevational view, partly in section, of this invention, FIG. 4 is a sectional view taken on the line 4—4 of FIG. 3, FIG. 5 is an enlarged perspective view of the cover to the burner chamber with a portion cut away to more fully illustrate the construction thereof, FIGS. 6 and 7 are perspective views similar to FIGS. 1 and 2, respectively, but showing this apparatus adapted for an electrical heating element, and FIG. 8 is a cross sectional view taken on the line 8—8 of FIG. 7.

Referring to the drawings, I have shown in FIG. 1 a common form of pig farrowing pen 12 adapted for two litters. Such pen is merely illustrative to show the general environment in which my invention is used and it will be understood that other and varied types of pens, stalls, animal houses or the like are in use wherein this invention can be employed. In the illustration shown, however, such pens or stalls 12 include a stall 13 for the sow 14, with such stall being enclosed by suitable rails or fencing 16 and with at least one end 18 open for free ingress and egress of the sow, although some pens may be open at both ends or have gates which are not material to this invention. The stall or pen 20 for the litter 22 is adjacent pen 13 and separated by a partition 24 having a lowermost edge 26 approximately twelve inches above the floor to provide a passageway for the litter to reach its sow for feeding, but insufficient in size to permit the sow to get into pen 20. No invention is claimed for such pen 12 and as shown in FIG. 1 partitions 28 and 30 may be provided to form pen 32 adjacent and similar to pen 20 and the sow's pen 34 constructed similarly to pen 13. Thus arranged, litter pens 20 and 32 being adjacent each other afford a situation making possible the heating of both pens by a single apparatus for which this invention is capable as will later appear.

In FIG. 2 my heating apparatus or pig blanket as I have called it is indicated generally by the numeral 36. It comprises a hollow preferably rectangular heat distribution tank 38 having an overall width of preferably twenty-two inches or more and having a thickness of preferably one half inch or less but not exceeding one inch. The tank length will vary according to the desired area to be heated as will be later referred to in more detail. Tank 38 is formed with the two complementary walls 40 and 41 (FIG. 4) placed in parallel spaced relationship and sealed together at their perimeters as shown at 42 and including a normally horizontal center section 43 having the respective integral side sections 44 and 45 which are slightly bent, tilted, or inclined upwardly relative to the center section 43 as seen in the solid lines of FIG. 4. Suitable brackets or apertured ears 46 are provided on each corner of tank 38 to which straps or hangers 48 may be attached for suspending the tank above the pen as shown in FIG. 1, such straps being bolted, nailed or otherwise attached to the pen railing. Sealed within tank 38 is a suitable fluid 49 that can be heated to the desired temperature without pressure and that has a high enough freezing point so that for all practical purposes for which this invention is designed, the possibility of freezing is eliminated. In this respect I have preferably used a high temperature turbine oil. Fluid 49 is placed in tank 38 through opening 50 which is sealed by a fusible plug 51. Such plug is designed to melt at approximately 460° F. so that in event of some unforeseen contingency resulting in excess heating of the fluid 49, opening 50 will be cleared to provide a pressure outlet before any danger point is reached.

A heating element is provided for heating fluid 50 and while such element may be of any suitable type to perform the function which will be described, I have preferably used a gas type indicated generally at 52 in FIG. 3 that is very efficient and economical. I have also provided an electrical heating means designated generally at 53 in FIGS. 6, 7 and 8 for use when electrical power is desired by the user and available.

Element 52 includes an elongated housing 54 having the bottom 56 and sides 58 formed substantially square in cross section (FIG. 4) and being open at the top. Sides 58 terminate at the top in the outwardly projecting flanges 60 that are slidably disposed in and supported by the oppositely disposed tracks 61 secured to the underside of the center section 43 of tank 38. Housing 54 corresponds in length substantially with tank 38 and at one end 62 communicates with the upstanding vent stack 64 and at the other end 66 with the control assembly 68. End portion 66 of housing 54 contains a burner chamber or compartment 70 in which is mounted the burner 72 and includes a perforated baffle member 74 disposed above burner 72. Burner 74 is connected to controls 68 in a well known manner for gas devices of this type and no invention being claimed therefore, the same are not shown in detail other than the usual fittings 76 to illustrate connection to a supply line 78 which is designed for attachment to a source of fuel supply in a well known manner.

I have, however, provided two safety features which include a pig guard 80 made of expanded metal or a suitable grill that is mounted to the outer side of housing 54 adjacent the sides and bottom thereof, and a cover or cap 82 (FIG. 5) for the end of the control assembly 68 leading into the burner chamber 70. Cover 82 is rectangular in shape and is hollow to provide an air intake chamber 84 formed by the outer and inner walls 86 and 88 respectively. Chamber 84 communicates with the atmosphere only at the bottom, being closed on all other sides by the flange 90. Formed in the inner wall 88 of cover 82 is a plurality of louvers 92 that preferably open into air chamber 84 by extending upwardly and outwardly from wall 84 but which may be of any other suitable form or shape such as narrow slits to provide an indirect route of communication between the atmosphere and burner chamber 70. In this way, air travels upwardly into chamber 84, over louvers 92 and downwardly into the burner chamber 70 and field tests have established conclusively that it is impossible for straw in the pens to work its way through this circuitous route to the burner chamber and become ignited.

In operation, this apparatus 36 is suspended above a pen floor (FIG. 1) to provide radiant heat for such pens from above and more particularly is suspended in relatively close proximity over the pen or area to be heated so that directional control of the radiated heat is attained. In this way a minimum amount of heat can be utilized to adequately warm a designated small floor or pen area where heat is required, and this is a decided advantage in economy over heaters of similar purpose that dispense heat generally in a room and consequently use considerably more fuel without adequately warming a given floor area. It has been determined from extensive experiments that temperatures of approximately 220°–230° at the surface of tank 38 were required to provide adequate radiation over an area sufficient to assure warmth and dryness for two litters on the pen floor at temperature range of approximately 55°–60° F. Approximately eight and preferably twelve square feet of radiation area is desirable for this purpose and while deviations from the area served will necessarily affect the required operation of the heating element, I have found the serving of two litters at one time, the most satisfactory for those who use this type of device and I shall therefore describe the conditions which I have found most desirable.

As mentioned above, fluid 49 is a high temperature turbine oil and is the most satisfactory as will later be pointed out. Water, of course, may be used and I have done this in the course of my experiments. Such a heating medium introduces the possibility of a freeze-up when the unit is not in operation and also requires the use of a pressure vessel to get the desired temperature range indicated above which increases the cost of the purchaser. For these reasons I do not recommend the use of water although it will serve the purpose here subject to the hazard and disadvantage mentioned. The oil which I have adapted as a heating medium permits heating to the desired temperature range without pressure. Various other liquids have been tested that were also satisfactory but were found considerably more expensive than the one accepted. I have also found by painting or otherwise coating tank 38 to provide a black or dark colored underside and white or light colored top side that the desired temperature range mentioned above for such tank is approximately 15°–20° F. less than would be necessary without such coating to keep a uniform pen temperature over the desired area in view of the normal heat dissipation. This is, of course, due to the greater heat radiation capacity of the dark surface and aids in the economical use of fuel.

It will be understood that circulation of fluid 49 within tank 38 supplies the heat to the tank surfaces from which it radiates and in this respect, one of the important features of this invention is the construction of tank 38. The thickness of the tank 38 is important relative to the amount of fluid sealed therein because of the fluid cost and is also important relative to assuring proper fluid circulation should the tank become slightly tilted which is a likely possibility if not carefully levelled when mounted in a pen. It was found from experiments that a flat tank designed to be normally mounted in a level horizontal position should be at least one and one-half inches thick to assure circulation of the fluid if such tank were tilted to a slight degree. In this respect any tilt over one-half inch resulted in the lower end of the tank becoming dormant with such dormant area becoming progressively greater in proportion to the degree of tilting. While such a tank will operate satisfactorily within certain limits as indicated, the quantity of fluid required makes a substantial cost item and for this reason and also because mounting requirements are too critical, a flat type tank is not recommended as the most efficient use of this invention.

From the above experiments and observations, I developed tank 38 with the side sections 44 and 45 tilted upwardly relative to the center section 43 which makes it possible for the tank 38 to be tilted at least two and a half inches as indicated by A in FIG. 4 without any significant effect on the circulation of fluid 49 and temperature of the tank surfaces. The degree of allowable tilt of tank 38 may be varied by changing the inclination of sides 44 and 45 since I have found that the temperature gradient in the tank will remain practically the same as long as one of the sides does not go below a level plane. This relatively wide range of operable positions for this apparatus is an important feature in its commercial success since its efficient operation is not dependent upon a critical position which few purchasers will take the time to assure. The structural formation of tank 38 as described makes it possible to use a tank of one half inch thickness without loss in heating efficiency and with considerable reduction in cost for the fluid required. While such a tank thickness is thus the most practical, it will be understood that from a standpoint of principle of operation, such dimensions may be varied.

With reference now to FIGS. 6, 7 and 8 I have shown tank 38 provided with the electrical heating element 53. Tank 38 here is substantially the same and operates the same as previously described so that like parts are given like numerals. Two spaced electrical heating elements 94 and 96 are disposed in spaced parallel relationship within the center section 43 and extend therein through fluid 49 parallel to the longitudinal axis of such section as shown. If necessary to accommodate the cross sectional area of elements 94 and 96, passageways in section 43 may be formed by the complementary cup shaped pair of ribs 98 and 100 formed in the respective tank walls 40 and 41. At one end of tank 38 there is mounted a suitable junction box 102 electrically connected in a well known manner to elements 94 and 96 for supplying current to one or both of such elements under control of switch 104. No invention is claimed for such switch since many suitable types are commercially available and thus the same is not shown in detail. Tank 38 with element 53 will be suspended over a pen to operate as previously described.

It is submitted that the invention shown and described is aptly suited to achieve the purposes intended and is characterized by a combination of highly useful and mutually cooperating elements that combine their respective and proportionate functions in accomplishing the objects sought to be obtained.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or mechancal equivalents which may be reasonably included within their scope.

I claim:

1. In a heating apparatus, an elongated heat distribution tank of uniform cross section having an elongated flat rectangular center section and two oppositely disposed elongated flat rectangular side sections, said side sections being inclined upwardly relative to the plane of said center section and presenting respective top surfaces angularly disposed to the top surface of said center section, said tank having a thickness not exceeding one inch and having a width at least twenty-two times greater than said thickness, a fluid sealed within said tank, a heating element attached to said center section and extending longitudinally of the same, and means for suspending said tank in close proximity above an area to be heated.

2. In a heating apparatus, an elongated heat distribution tank of uniform cross section having an elongated flat rectangular center section and two oppositely disposed elongated flat rectangular side sections, said side sections being inclined upwardly relative to the plane of said center section and presenting respective top surfaces angularly disposed to the top surface of said center section, said tank having a thickness not exceeding one inch and having a width at least twenty-two times greater than said thickness, a fluid sealed within said tank, a heating element within said center section and extending longitudinally of the same, and means for suspending said tank in close proximity above an area to be heated.

3. Apparatus for heating a restricted floor area of a room or the like, comprising a normally horizontal hollow heat distribution tank of uniform cross section, said tank defining an elongated flat center section bordered along each longitudinal edge by respective integral flat side sections each of which is slightly inclined upwardly relative to said center section, said tank having a thickness not exceeding one inch and having a width at least twenty-two times greater than said thickness, the interior of said sections defining a single tank area, a fluid sealed within said tank, a heating element attached to and extending longitudinally of said center section for applying heat thereto for heating said fluid, the angular position of said side sections affording means for circulation of heated fluid to uniformity heat the tank surfaces, said tank being adapted to be positioned so that it is closely adjacent and extending over substantially all of a restricted area to be heated, the flat surface of said sections affording uniform heat radiation to said area, and said tank susceptible of being tilted without impairing the effective uniform radiation of heat from all surface areas so long as said side sections remain on or above the normal horizontal plane of said center section.

4. A heating apparatus for uniformly concentrating radiated heat over a specified floor area, comprising a hollow sealed elongated heat distribution tank defined by spaced parallel top and bottom flat walls so that said tank interior is of uniform cross section, said tank having a thickness not exceeding one inch and having a width at least twenty-two times greater than said thickness, said tank including a flat bottom elongated center section and two oppositely disposed flat bottom elongated side sections, said center section being normally on a horizontal plane and each side section being inclined upwardly relative to said center section, a fluid sealed within said tank, a heating element disposed within said center section and extending longitudinally thereof for directly heating said fluid whereby heat is uniformly radiated from said flat sections, and means adapted to support said tank in close proximity over a specified floor area to be heated so that said side sections are on or above the normal horizontal plane of said center section.

5. A heating apparatus for uniformly concentrating radiated heat over a restricted floor area, comprising a relatively thin flat elongated hollow heat distribution tank, said tank defining a normally horizontal flat elongated center section and oppositely disposed upwardly inclined elongated flat side sections integral therewith, each of said sections having respective spaced parallel flat top and bottom walls, said tank having a thickness not exceeding one inch and having a width at least twenty-two times greater than said thickness, the interior of said sections defining a single tank area of uniform cross section, a fluid sealed within said tank, means attached to said center section and extending longitudinally thereof for heating said fluid whereby heat is uniformly radiated from the flat walls of said sections, and said tank susceptible of being tilted without impairing the effective uniform radiation of heat so long as said side sections remain on or above the normal horizontal plane of said center section.

6. A tank as defined in claim 1 wherein said heating element includes a burner chamber and cover therefor, and means in said cover providing a circuitous route for the passage of air from the atmosphere to said burner chamber.

7. In a heating apparatus, an elongated heat distribution tank of uniform cross section having an elongated flat rectangular center section and two oppositely disposed elongated flat rectangular side sections, said side sections being inclined upwardly relative to the plane of said center section and presenting respective top surfaces angularly disposed to the top surface of said center section, said tank having a thickness not exceeding one inch and having a width at least twenty-two times greater than said thickness, a fluid sealed within said tank, a heating element attached to said center section and extending longitudinally of the same, and means for suspending said tank in close proximity above an area to be heated.

References Cited in the file of this patent

UNITED STATES PATENTS

| 1,359,049 | Furstenau | Nov. 16, 1920 |
| 1,535,097 | Brown | Apr. 28, 1925 |
| 2,037,861 | Lee | Apr. 21, 1936 |
| 2,232,342 | Prosser | Feb. 18, 1941 |
| 2,503,191 | Branson | Apr. 4, 1950 |
| 2,579,646 | Branson | Dec. 25, 1951 |
| 2,764,127 | Newman | Sept. 25, 1956 |

FOREIGN PATENTS

| 252,925 | Germany | Oct. 29, 1912 |
| 326,163 | Germany | Apr. 29, 1929 |
| 399,681 | Great Britain | Oct. 12, 1933 |
| 527,195 | Belgium | Mar. 13, 1954 |